May 16, 1944. G. M. SCHUEDER ET AL Re. 22,482

SPACE HEATER

Filed March 1, 1939 3 Sheets-Sheet 1

INVENTORS
George M. Schueder
Eugene F. Farrell
BY L. G. Harnick Jr.
ATTORNEY.

May 16, 1944. G. M. SCHUEDER ET AL Re. 22,482

SPACE HEATER

Filed March 1, 1939 3 Sheets-Sheet 2

INVENTORS
George M. Schueder
Eugene F. Farrell
BY L. H. Carmick, Jr.
ATTORNEY.

May 16, 1944. G. M. SCHUEDER ET AL Re. 22,482

SPACE HEATER

Filed March 1, 1939 3 Sheets-Sheet 3

INVENTORS
George M. Schueder
Eugene F. Farrell
BY L. G. Harnick Jr.
ATTORNEY.

Reissued May 16, 1944

Re. 22,482

UNITED STATES PATENT OFFICE 22,482

SPACE HEATER

George M. Schueder and Eugene F. Farrell, Detroit, Mich., assignors to Evans Products Company, Detroit, Mich., a corporation of Delaware Original No. 2,268,778, dated January 6, 1942, Serial No. 259,094, March 1, 1939. Application for reissue November 19, 1942, Serial No. 466,202

42 Claims. (Cl. 126—110)

This invention relates to certain improved features, arrangements, and constructions for space heaters or the like, and has special reference to floor-supported, air circulating, unit heaters for rooms, small homes or the like which are direct-fired or contain a high temperature air heating-combustion unit burning oil, gas, or other fuels, and which contain a fan in their lower portions to pull air to be heated downwardly therethrough, and to provide a low level, but safe, forced discharge of the relatively high temperature air across the room floor.

Preferably, the fan or blower, the air heating unit, the air openings and other parts are so arranged that the heater may be operated, if so desired, by the conventional or natural upward, thermal convection air flow therethrough, or else by the above-mentioned blower-forced downward or contrathermal air flow.

In the two illustrated embodiments of the present invention, the unit heaters include an upright cabinet having upper and lower air openings and containing an upright combustion-air heating unit. This heating unit may employ the conventional pot-type burner for oil or the like housed in a drum also forming the expansion chamber. Associated with this combustion unit is an upwardly-extending air heating passage. As will be apparent to those skilled in this art, various types of combustion units or associated air heating passages may be employed within the purview of this invention.

The bottom of the air heating passage is closed, preferably by a closed bottom for the cabinet spaced slightly above the room floor by the cabinet's supporting feet. Preferably, this lower air opening is formed by a long, narrow grille extending across the front portion of the cabinet adjacent its bottom and comprising upright members integral with the cabinet side walls. The upper air opening may be a large area grille in the flat top of the cabinet.

The above-described structure will operate by the conventional natural or upward air flow, and this type of operation is more or less satisfactory for small or moderate amounts of heating or for low fuel settings. However, it will be appreciated that when it is desired to greatly increase the rate of heat, this natural or "chimney" type of air circulation limits the capacity of the unit so that blower-forced circulation is desirable. However, if the blower or fan is used to assist the upward flow and distribution of the heated air, it merely accentuates one of the objections of the upward flow type space heaters; that is, stratification of the air and cold floors. This uneven distribution results in high temperature in the upper portion of the room and comparatively low temperature at and adjacent the floor level, reduces the comfort materially, and requires that more heat and fuel be used to reach the desired comfort level.

Therefore, it is desirable to force the heated air out close to the floor and preferably in a thin, wide stream across the room. This will not only heat the lower portion of the room and give proper distribution of air, but will increase the comfort by proper air circulation. However, in the large capacity space heaters of this type employing a high temperature combustion type air heating means, the air discharge from the lower opening or grille may be at temperatures of as high as or over 250° F.

Whereas the underwriters will not permit the floor temperature to be raised more than about 90° F. above room temperature, or to a maximum of about 160° F., if air at even as high a temperature as this is permitted to strike the floor, it will produce undesirable results since it will be injurious to floor covering, such as linoleum, or to the wood of the floor itself.

The present invention provides means to eject this forced or relatively high velocity stream or air across the floor in a stream which issues from the heater cabinet very close to the floor but substantially parallel thereto or having little or no downward component so that it does not strike the floor close to the heater. After the air has moved about 18 inches from the heater, its temperature is much lower, due to diffusion with cooler air, and, in addition, warm air is rising from the stream so that hot air striking the floor beyond this range will not be objectionable.

This invention contemplates a very simple arrangement or means to force and direct this stream of hot air, and includes means consisting of a substantially horizontally-discharging blower in the lower part of the cabinet at or about the level of the lower opening, so that the fan blades themselves force the air in a substantially horizontal stream and give it directly the desired directional characteristics. Thus it is not essential to have air directing vanes or fins associated with the lower opening, and it will be appreciated that since the air is being pulled or drawn down through the air heating passage, which is thus at a slightly sub-atmospheric pressure, it is not necessary to employ any movable top closure or shutter in the upper portion of the cabinet to achieve downward air flow. Preferably, this fan is positioned under the air heating unit, and in the preferred form it consists of a wide, thin or flat, centrifugal blower of the "backward tipped" blade type, the advantages of which are mentioned hereinafter.

Where the long, narrow, blower discharge opening or grille is substantially co-extensive with the effective discharge area of the blower, or where this grille extends around the periphery of the centrifugal blower, as in Figs. 1 and 4, no plenum chamber or relative restriction of the opening formed by the grille will be necessary to achieve flow of air from the whole length of the grille. However, in cases where the long discharge grille extends across the front face of the rectangular cabinet containing the blower, it is desirable to form these lower openings as relatively restricted so that the high temperature air builds up a pressure in a plenum chamber, thus insuring its discharge through the whole length of the opening.

In either form of the device, it is desirable to make this lower grille integral with the side walls of the cabinet and formed of upright members which form a part of and strengthen or brace the cabinet side walls. In addition, in the case of a flat front, rectangular cabinet, these upright members form relatively short restricted openings tending to produce an outward air flow normal to the cabinet front.

The capacity of a given unit may be raised by forced draft to the combustion unit supplied by a connection from the air circulating fan or blower, and, in addition, the manual control for the fuel setting may be interconnected to the switch for the blower electric motor so that the blower goes on only at high fire or high fuel settings and is automatically turned off at low fire.

In order to reduce noise and vibration, both the fan and its driving electric motor are carried by a vibration-absorbing mounting, and in order to permit ready replacement or servicing for the cheap type of electric motor, this motor or the motor blower unit is mounted so that it may be readily removed through the cabinet bottom.

It is important, particularly where a rather cheap type of electric motor is used, that it be mounted out of the path of high temperature air and positioned away from radiated heat. In addition, it is desirable to further reduce its temperature by providing means for drawing cool air over or through this motor by a connection to the intake side of the air circulating fan.

The tank for oil or other fuel and the float valve control chamber are also mounted out of the path of high temperature air and are shielded from radiated heat. In the case of a completely enclosed cabinet, shown herein as of the "low boy" type, these two units are mounted in an auxiliary, upwardly-extending and open-ended air passage which is so arranged that the blower operation draws cool air over and past these units.

Other features and arrangements of this invention will be apparent from the detailed description and drawings herein.

In general, the objects of this invention are to provide an improved and simplified unit space heater providing forced, low level discharge of hot air.

More particularly, objects of this invention are to provide a forced air circulating space heater in which the fan or blower is positioned at substantially the same level as the low level lateral discharge opening so that high temperature air is forced and is horizontally directed by the fan or blower blades to and out this lower opening, thus eliminating the necessity for any vanes, fins, or the like to guide this high temperature air on its discharge from the cabinet, and thus providing a safe stream of high temperature air across and close to (but not immediately striking) the room floor; to provide a heater of this type in which the air is drawn or pulled down through the air heating passage, thus removing the need for any upper or top shutters or other closures to selectively prevent or permit the upward thermal flow; and to provide forced draft to the combustion unit from the same air circulating fan or blower.

Other objects of this invention are to provide a space heater which is particularly quiet in operation by carrying the blower and its driving motor on vibration-absorbing mountings, and to provide a space heater, or the like, which may employ a relatively cheap type of blower-driving electric motor mounted so that it can be readily removed, positioned out of the path of high temperature air, shielded from radiated heat, and having means so that the air circulating fan or blower pulls cooling air over or past this electric motor to reduce its temperature.

Other objects will be apparent from the foregoing statement of the general features and advantages of this invention and from the following detailed description and drawings.

Referring to the drawings, in which:

Fig. 1 is a general view of a space heater, in side elevation, embodying a preferred form of the invention, a portion being broken away to disclose the nature of parts interiorly of the space heater;

Fig. 2 is a view thereof, in vertical section, taken substantially on the line 2—2 of Fig. 1, except that the blower 32, the burner 6, and associated parts are shown in elevation;

Figure 1:
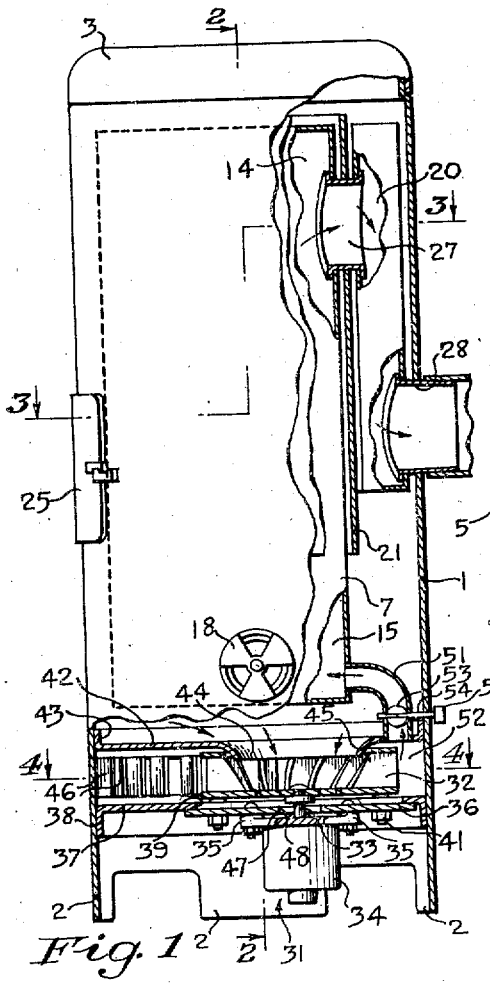
Figure 2:
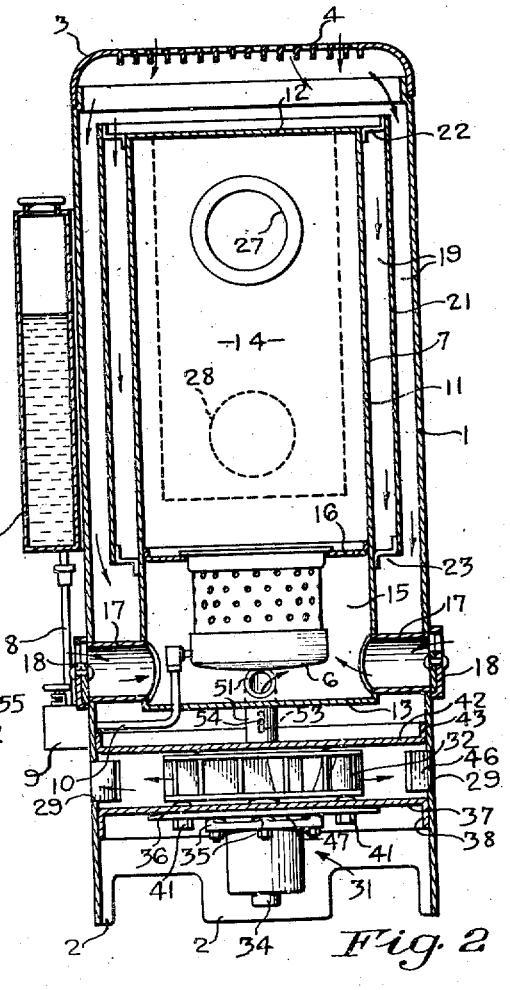

Referring now more particularly to the drawings:

The embodiment of Figs. 1 to 4, inclusive, discloses a very cheap and compact form of space heater which is designed for maximum performance at a low price, which is not entirely selfcontained, and which does not have the attractive appearance obtainable in the rectangular cabinet type. This space heating unit comprises a cabinet, outer casing or shell 1, preferably of sheet metal, in the form of a cylinder which may be formed, for example, by a single sheet of metal bent and joined along a seam, said cabinet having integral supporting feet 2 the portions between the feet being cut away as shown. Casing 1 is surmounted by and has suitably secured to it a cap 3, preferably a one-piece sheet metal stamping having an integral air passage grille 4 formed therein. The elements of the grille 4 are simply cut and bent-over portions of the upper surface of the cap 3, and it will be apparent that these elements, being integral with the cap, serve to brace or maintain its rigidity and also give a pleasing exterior appearance with low resistance to air flow therethrough. It will be apparent to those skilled in this art that casing 1 and cap 3 may be formed of sheet metal in other ways if desired.

When liquid fuel, such as oil, is used, this heating unit is provided with a fuel reservoir 5 which may be positioned exteriorly and laterally of the casing 1 and supported thereon. Fuel, such as oil, is conveyed from reservoir 5 by means of a pipe 8 through a manually regulatable valve and float type level control unit 9 and by pipe 10 to a pot-type burner 6. Pipes 8 and 10 are provided with conventional or approved fittings, and since the details of the valve-float unit 9 and the pot burner 6 form no part of the present invention and are well-known in this art, they are not illustrated or further discussed herein.

As is conventional in this art, the fuel control valve unit 9 is provided with a suitable control linkage (not illustrated) whereby the fuel supply can be turned on or off and regulated from some desired point.

The upright combustion unit 7 comprises a drum formed by a cylindrical member having side walls 11 and upper and lower end walls 12 and 13, respectively, which are joined and sealed to the side walls in any desired manner. This combustion unit is divided into an expansion chamber 14 and a burner chamber 15 by a horizontal partition plate 16 having an up-turned, peripheral flange welded screwed, or otherwise suitably secured to the walls 11. From this plate 16 the burner 6 is suspended centrally of the vertical axis of the stove. The combustion unit 7 may be suitably supported from the casing 1 by any conventional means, but, as shown, this supporting is achieved by a plurality of conduits 17—17, rigidly but removably connected to both the casing 1 and the walls 11, and by tubes 51—51 rigidly but removably connected to walls 11 and plate 42. Flue connections 27 and 28 brace the upper portion of the combustion unit with respect to casing 1. Air to support combustion is supplied through these conduits 17—17, and this air supply may be regulated by means of suitable dampers 18—18 positioned at the outside ends of the conduits 17. Although the dampers 18 may be of any approved or conventional type, they are shown as being of the rotary, divided-disk type. The numeral 19 designates the air heating space or upwardly-extending passage or passageway between the walls 11 and the outer casing 1. It will be noted that this passage 19 is open at its upper and lower ends.

The side walls 11 of the expansion chamber 14 are surrounded by an upright wall or shroud 21 supported from walls 11 by suitable brackets 22 and 23 and having open upper and lower ends. Preferably, this shroud or shield 21 extends from, or slightly above, the top of the combustion unit 7 to the bottom of the expansion chamber 14, and it is of curvilinear transverse form surrounding the expansion chamber 14. Shroud 21 divides passage 19 into an inner and an outer portion. Such a shroud acts as a radiation shield and aids in reducing the temperature of the outer shell. It also confines the air being heated in the inner passage, raises its velocity and increases the efficiency of the heater.

An opening 24 is provided in the front of the shroud 21 which, together with door 25 in casing 1 and door 26 in wall 11, provides access to the interior of the expansion chamber 14 for lighting the burner, cleaning it, etc. It will be noted that upon removal of damper 18, the fitting connecting pipe 10 to burner 6 may be removed through 17, after which burner 6 may be lifted out through doors 25 and 26 and opening 24 for servicing, or the like.

Figure 3:
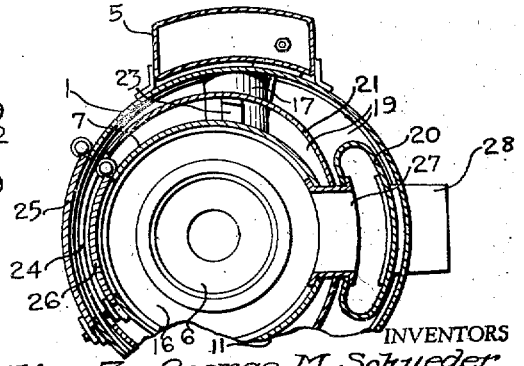
Fig. 3 is a transverse section taken on the line 3—3 of Fig. 1.
Figure 5:
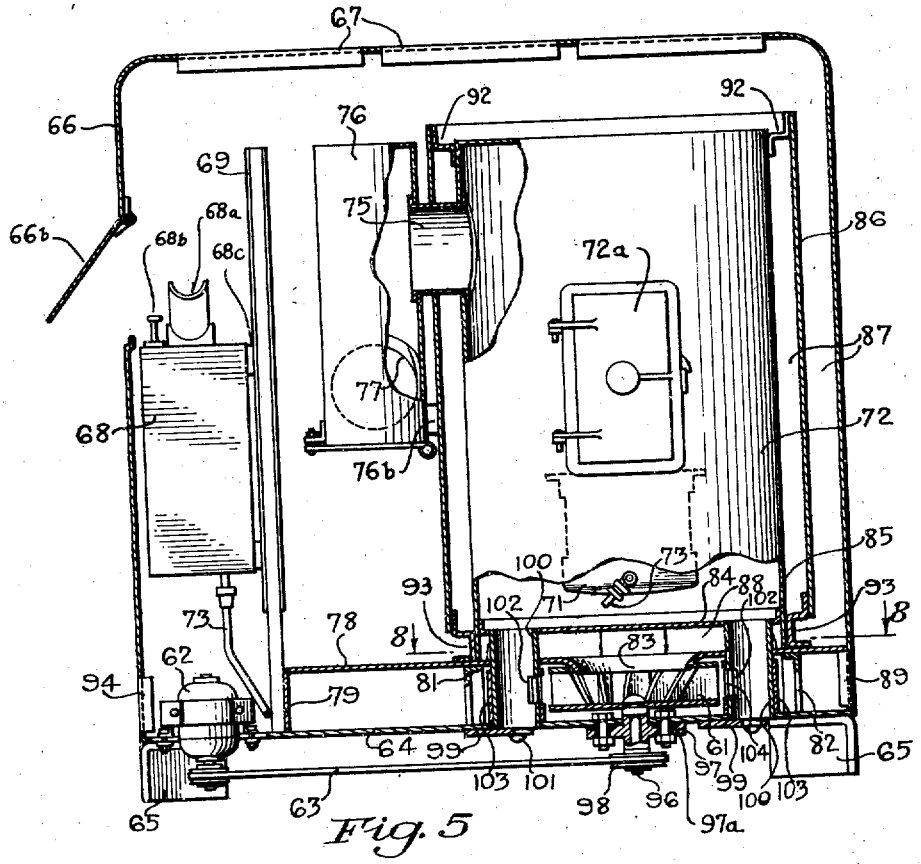
Fig. 5 is a front view of a rectangular or "low boy" type space heater of an alternative construction, the outer casing or shell thereof being sectioned away centrally and longitudinally of said casing to disclose an alternative embodiment of the invention.
Figure 6:
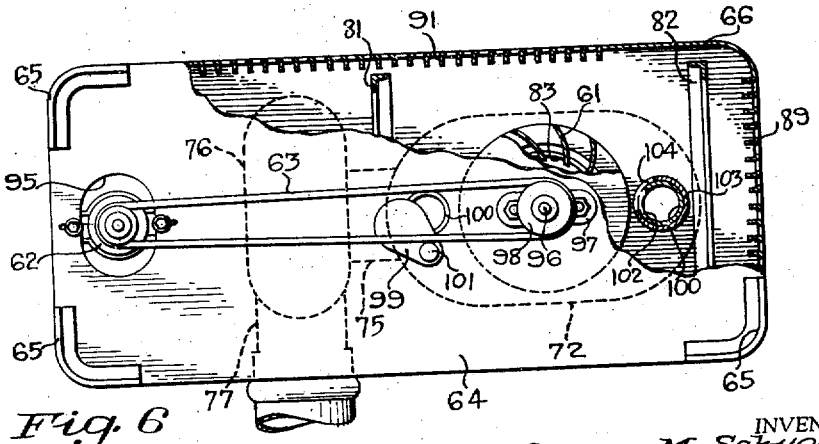
Fig. 6 is a view of the bottom of the space heater shown in Fig. 5, parts being broken away to disclose the nature of underlying parts.
Figure 8:
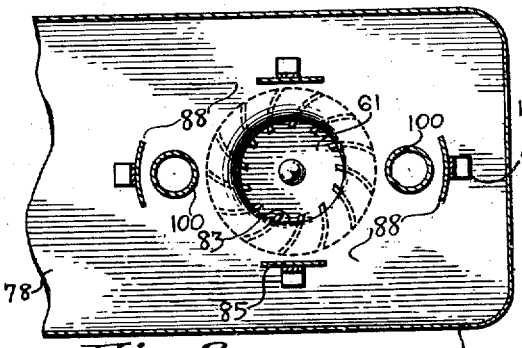
Fig. 8 is a fragmentary view, in section, taken on the line 8—8 of Fig. 5.
Figure 9:
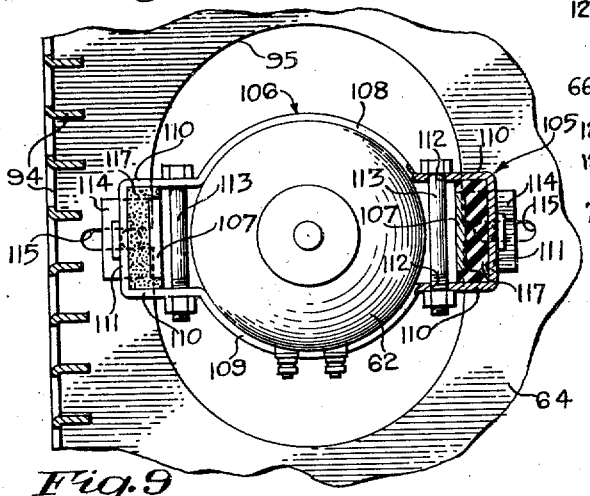
Fig. 9 is a detail fragmentary top plan view of the means for mounting the motor.

To increase the efficiency of this space heating unit, an economizer 20, consisting of a downwardly-extending heat exchanger and additional expansion chamber, is provided outside of shroud 21 in the outer part of passage 19 so that additional heat may be removed from the escaping flue gases. As shown in Figs. 1 and 3, the combustion unit 7 is disposed eccentrically of and towards the front of the heating unit in order to provide room for this economizer 20, which is illustrated as being between the shroud 21 and the casing 1 although it will be apparent that it might be positioned inside the shroud if desired. A cross-section through the upright walls of economizer chamber 20, which may be formed of sheet metal in any desired manner, shows that it is formed of an elongated and curved oval, as shown in Fig. 3. Flue gases rising to the top of the expansion chamber 14 will pass out of the upper flue 27, will be drawn through the economizer 20 where they undergo additional expansion and give up additional heat, and are conducted by removable flue connection 28 to the stack or the like. This economizer chamber 20 may be supported in any convenient manner, such as its connections to the flue pipes 27 and 28, and, as noted above, it and its connections 27 and 28 also serve to brace drum 7.

The complete combustion unit 7 with its shroud 21 may be removed for major servicing by removing cap 3 and lifting these units out the open top after disconnecting conduits 17—17, 51—51, pushing flue connection 28 back into economizer 20, pushing economizer 20 in close to shroud 21, and disconnecting oil pipe 10. This heater is assembled in substantially the reverse order of operation.

As will be discussed in greater detail hereinafter, air to be heated may rise through passageway 19 by normal, thermal circulation, or, at the option of the user, air may be pulled down through space 19 by a fan or blower.

Figure 4:
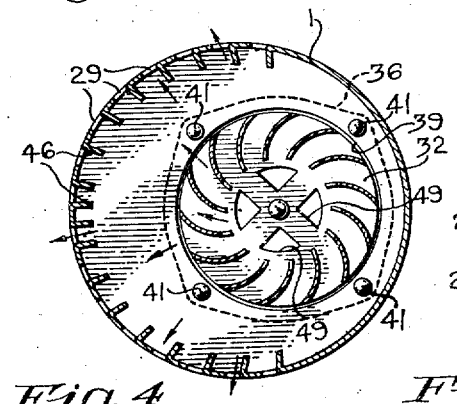
Fig. 4 is a transverse section taken on the line 4—4 of Fig. 1.

A blower unit or fan means, designated generally by numeral 31, is provided in the lower portion of the cabinet below the combustion unit 7. Although various types of blowers or fans may be employed within the broad purview of this invention, in the preferred embodiments illustrated, this blower unit employs a comparatively large diameter and rather flat or thin centrifugal blower wheel 32 which is preferably of the so-called "backward tipped" blade type. This is illustrated in Fig. 4 in which the blower wheel 32 is intended to be rotated counter-clockwise. As is understood in the ventilating art, this "backward tipped" blade type of centrifugal blower will deliver a large volume of air at comparatively low velocity as distinguished from the high velocity discharge of a small volume. In addition it is a quiet running type.

It will be noted that the motor-blower unit 31 is positioned eccentrically or to the rear of the cylindrical casing 1 (see Fig. 4) so that the imperforate back portion of wall 1 will form a more efficient scroll closer to the blower blades.

Blower wheel 32 is mounted on the shaft 33 of a conventional electric motor 34 which is energized and controlled by a conventional circuit and conveniently positioned switch which are not illustrated herein. Arms 35 secured on the casing 34 are bolted or otherwise secured to the supporting disk 36. These arms 35 may be formed of suitable vibration-absorbing and sound-deadening material, such as a plastic, or there may be yieldable, vibration-absorbing and sound-deadening material, such as rubber, interposed between arms 35 and disk 36 to quiet the operation of the blower-motor unit.

A circular base plate 37 is secured in the lower part of casing 1 in any convenient manner, such as a welded or other connection between an integral flange or apron and the walls of casing 1. The base plate is provided with a circular aperture 39 which is positioned eccentrically thereof and towards the rear of the heating unit. This aperture is large enough to pass the blower wheel 32 but is smaller than the disk 36. The supporting disk 36 is suitably and removably secured to plate 37 by bolts 41. It will be apparent that by undoing bolts 41 the entire blower unit can be removed for servicing or replacement since the blower wheel can be withdrawn through the circular aperture 39. Above, and in close proximity to, the blower wheel 32 is an enclosure disk 42 secured to the walls of shell 1 by an integral, upwardly-extending flange 43 otherwise similar to flange 38 of plate 37. Disk 42 has a circular aperture 44 which is concentric with the axis of the blower unit 41 and is defined by a uniformly rolled lip 45 forming, in effect, a nozzle extending slightly within the open upper end of the blower wheel 32. It will be apparent that when the blower is not running and the burner is operating, air may enter through the grille openings 29, pass through the blower blades and aperture 44, and rise up through the heating passageway 19 to be discharged through the top grille 4. When the blower is running, it will pull air down through a reverse of this path and discharge it directly out through the grille openings 29. Note that the blower itself and its horizontally-directed discharge are at the same horizontal level with the grille openings, so that the blower blades themselves give the air stream its directional characteristics, discharging it horizontally to and out the grille openings. These openings are spaced slightly above the floor so that the high temperature air issues in a wide, flat, substantially horizontal stream which does not immediately impinge upon the floor and cause dangerous overheating thereof.

This lower opening or grille is formed of a number of short ports 29 extending a little more than halfway around the circular casing 1. Each individual port is preferably of rectangular contour and is produced by shearing three of the four sides of the port, thereby producing a tang 46 extending from the fourth side (Figs. 1 and 4). The inwardly-turned tangs 46 are arranged to point toward the axis of blower unit 31 to give a radial guiding effect to the air discharged from the blower 32. It is conventional to place such heaters against the wall, and it will be noted that the ports 29 do not extend around the back portions of the heater unit so that high temperature air is not discharged against the wall. The upright, integral tangs 46 form a part of the casing 1 and afford a considerably stronger construction than would be obtained by a separate grille. It will also be noted that ports 29 arranged around the periphery of the circular casing serve to "fan out" the stream of air; that is, the air, being more or less radially directed, will emerge in a widening stream.

In this form of the invention, the opening formed by ports 29 of the integral grille may be quite large relative to the rate of discharge from the blower wheel 32, so that there is comparatively little pressure built up in the blower chamber formed between the bottom 37 and the partition disk 42 and the air is thrown out through the openings 29 with little or no jet effect. Thus it will be apparent that in this form of the invention the openings or ports 29 do not necessarily have to perform any function of directing the air stream.

It is desirable that the heater be so designed that a cheap type of electric motor can be used. To this end, the motor-blower unit is readily removable for servicing, as discussed above, and, in addition, since a cheap type motor is particularly susceptible to overheating, it is necessary that it be kept cool. This is accomplished by mounting it in the space beneath the cabinet bottom where it is shielded from the high temperature air stream and radiated heat by the bottom 37. In addition, it is desired to cool this electric motor 34 by the following arrangement. There is a space 47 between the motor and the bearing disk 36, and the disk 36 has a relatively large area opening 48 for the motor shaft and for air flow. The bottom of the blower wheel has a plurality of apertures 49 around its shaft so that the interior or low pressure region of the blower wheel is communicated through these openings 49 and opening 48 to the space above the electric motor. Thus, when the blower is running, relatively cool air on or adjacent the floor will be drawn up from the floor and through or around the motor to cool the same. This slight addition of cool air will not materially affect the heater's performance.

In order to raise the combustion rate of a given size unit for high fuel settings, it is advantageous to add a regulated amount of air under forced draft to the combustion unit. To this end, conduit or elbow tube 51 is disposed rearwardly of the space heater to connect the burner chamber 15 with the blower chamber 52 between the plate 37 and the baffle 42. It will be noted that this tube 51 communicates the burner chamber with that part of the blower chamber 52 which is remote from the ports 29 and consequently at its point of highest pressure. A suitable damper 53 mounted on a shaft 54 to be manually adjusted by handle 55 may control the flow of air through tube 51. If it is desired to achieve a pressure materially above that of the atmosphere in burner chamber 15, dampers 18 should be closed. However, since the burner chamber normally draws in air through air supply conduits 17 and is thus at a slightly sub-atmospheric pressure, a material increase in the burner air supply will be achieved if the pressure therein is raised to about atmospheric, in which case dampers 18 may be left partly open.

Figs. 5 to 10, inc., disclose an alternative embodiment of the present invention including a so-called "low boy" or rectangular type of cabinet which encloses all of the operating units, such as the oil tank, float valve unit, etc. In this modification, the blower 61 is driven by a small, cheap, electric motor 62 by means of a conventional V-type belt 63.

In the description of this modification, those features or units, such as the combustion unit, the centrifugal blower, the control valve-float chamber, and others, which are similar to those described above in connection with Figs. 1 to 4, inc., will not be discussed in detail nor their similar advantages or cooperations further pointed out.

In general, this construction comprises a generally rectangular or oblong sheet metal base 64 supported by suitably secured sheet metal feet 65—65, a sheet metal casing 66 of rectangular transverse contour with rounded corners and rounded top edges, and a large area opening or openings formed by an integral grille 67 in the top thereof. This casing or shell 66 with its integral top and grille 67 may be formed from sheet metal in any desired or conventional fashion.

The base 64 carries and serves as a support for all the operating units of this heater, and the casing 66 which is in the form of an open-bottom shell is slipped down over the base and its several operating units, supported thereon and suitably secured thereto. Base 64 carries a vertical partition 69 or insulating baffle also serving as a radiation shield which extends from front to back of the base and the casing 66 and approximately to the top of the combustion unit.

Fuel tank 68 is removably supported by brackets 68C on the other side of partition 69 from the combustion unit. A suitable door in the end of the cabinet 66 permits a combined filler spout and closure unit to be swung out through this door opening for filling. In addition, this door permits inspection of a suitable oil or fuel level indicator 68B.

Fuel is conveyed from the tank 68 to a suitable or pot-type burner 71 within the drum-like combustion unit 72 by means of a pipe line 73 having suitable fittings and including a control valve-float chamber unit of the same type as unit 9 discussed above. Although not illustrated, the burner 71 is supported in the combustion unit 72, and the combustion unit is divided by a partition into an expansion chamber and a burner chamber substantially in the manner disclosed in connection with Figs. 1 to 4, inc.

Flue gases are exhausted from the combustion unit 72 by an upper flue connection 75 and a downwardly-extending economizer-heat exchanger 76 (which is formed of sheet metal in any desired fashion) and out through lower flue connection 77 to a conventional stack or chimney. Note that the economizer-heat exchanger 76 is positioned outside of the shroud or radiation shield 86 in the upwardly-extending space between the combustion unit and the upright partition 69.

Combustion unit 72 is mounted on the horizontal partition member 78 which is in turn supported from the base 64 by downwardly-turned end portion 79 and braces or supports 81 and 82. The downwardly-turned end portion 79 of this partition 78 may be suitably secured to the upwardly-extending partition 69. It will be noted that this partition 78 with its downwardly-turned end portion 79 and its braces 81 and 82, which last are suitably secured to the bottom 64, form with the bottom 64 a rigid box-like frame for the base of this heater unit. This frame is quite strong and rigid although it is made of a relatively small quantity of sheet metal. In addition, it will be apparent that this frame is tied to and cooperates with the upwardly-extending partition 69 to brace the sheet metal walls of the cabinet 66. Front, back, and one end of the flat chamber covered by this partition 78 are formed by the front, back, and one end wall of the cabinet 66.

Partition member 78 is suitably secured to the base 64 by any conventional means. Centrifugal blower 61, which is of the "backward tipped" blade type similar to blower 32 discussed above, is positioned underneath the combustion unit 72, and directly above the blower 61 the partition 78 is provided with an aperture 83 having a uniformly rolled edge to provide a nozzle communicating with the interior of the centrifugal blower wheel 61. The bottom of the combustion unit 84 is spaced above the partition 78 and is suitably secured to the sides 85 of the combustion unit. The sides 85 of the combustion unit 72 are cut away at their lower portions to provide openings 88 between the feet or downwardly-extending portions which rest on partition 78 and are secured to strap members 93. A shroud or radiation shield 86 spacedly surrounds the combustion unit 72 and is mounted thereon and on the partition 78 by metal straps 93 which also serve to secure the combustion unit to the partition 78. These straps 93 may be screwed, welded, or otherwise secured.

Upon operation of the blower 61, air is pulled down through grille 67 to the downwardly-extending air heating passage 87 (which is divided by wall 86) through an opening 88, and through aperture or nozzle 83 into the blower 61 from which it is discharged into the flat chamber under the partition 78 and above the bottom 64.

A long, narrow, integral grille 91 is formed of integral tangs struck out of the casing sheet metal in a manner similar to that described in connection with Figs. 1 to 4, inc., and the ends of the casing contain similar grilles 89 and 94. The high temperature heated air is discharged from the flat chamber under plate 78, through grille 89 and the long front grille 91. In order to insure the discharge of this heated air from the whole length of grille 91 and also from grille 89, the tangs forming these grilles are rather closely spaced to form short and relatively restricted openings. Thus the total blower discharge opening from the cabinet is somewhat restricted relative to the rate of blower discharge so that the flat chamber under plate 78 is, in effect, a plenum chamber from which the air discharges under pressure through the series of openings of the grilles 89 and 91. The inwardly-directed portions of the integral tangs forming these grilles, and the fact that they are close together forming short passages, aids in causing the outward air flow to be substantially normal to the cabinet front and end. It will be noted that, as described in connection with the modification of Figs. 1 to 4, inc., the blower-forced air stream is given its horizontal direction by the blower blades themselves.

During blower operation, relatively cool air to be heated enters the cabinet through the upper grille 67 and through the end grille 94 and through the opening in the bottom about the electric motor 62. Thus there are a plurality of air inlets. While a major portion of the air to be heated will be pulled down through the upper opening 67, a portion of the air will enter through grille 94 and the opening about motor 62 and rise through the end air passage formed between the cabinet walls and the upright partition 69 from which it will turn and be pulled down through the air heating passage around the combustion unit. This air rising up through the above-mentioned air passage will flow all around the oil tank 68 after having first been drawn past the electric motor 62 and the control valve-float chamber unit 74 which is positioned in this passage alongside the electric motor 62.

During blower operation, a natural upward flow of air through this end passage containing the oil tank is assisted by the blower. It will be apparent that when the blower is not running, there will still be a natural upward or thermal flow of air through this passage which will mix with and temper the natural or upward thermal flow of air through the air heating passageway. Thus, during either operation, there is a cooling air flow for the oil tank, the electric motor, and the float chamber unit.

Blower 61 is rigidly mounted on a shaft 96 which is, in turn, journaled in and carried by a bearing member 97. This member is bolted or otherwise secured to the bottom 64. It has a vibration-absorbing member 97A, of rubber or the like, between it and the bottom 64 and between it and its securing bolts to prevent any metal-to-metal contact and the transmission of vibration and noise from the blower wheel. A pulley 98 is keyed or otherwise secured to the lower end of shaft 96 and is driven by a conventional V-belt 63 which is connected by a similar pulley to the lower end of the driving shaft of electric motor 62.

Air to support combustion in the unit 72 is drawn up by the normal draft suction through a plurality of vertical conduits 100—100 which are disposed on either side of the blower and extend from the combustion unit bottom 84, through the partition 78, down to and through openings in the cabinet bottom 64. The amount of combustion air drawn from under the cabinet bottom may be regulated by suitable dampers 99—99 rotatable about pivots 101 to cover or uncover the lower ends of the conduits 100—100.

In order to provide a forced draft for the combustion unit from the blower wheel 61, the conduits 100—100 have apertures 102—102 directly facing the blower wheel discharge to receive hot air directly from this blower wheel and to convey the same into the combustion unit 72.

The area of these apertures 102 may be regulated by sleeves 103—103 which are telescoped over these conduits 100—100 and are provided with cooperating apertures 104—104 which are adapted to register with the apertures 102—102. By rotating either or both sleeves 103—103 about the conduits 100—100, the effective cross-sectional area opening into these conduits may be varied. It will be apparent that the operation of this forced draft organization will be similar to that described in connection with the modification of Figs. 1 to 4, inc.

The electric motor 62 is adjustably mounted relative to the motor 61 by means of a mount designated generally by the numeral 105 and comprising a strap metal yoke 106 and a pair of legs 107—107. The yoke 106 includes a pair of curved elements 108 and 109 embracing the vertical sides of the motor 62, and the yoke 106 is provided on opposite sides thereof with opposed necks 110 joined by portions 111—111. The necks 110 afford flat surfaces for holes 112 adapted to receive tie rods 113—113 so that clamping of said tie rods may pinch the yoke about the body of the motor 62. The lower extremities of the legs 107—107 are bent horizontally to provide feet 114—114. The feet 114—114 are cooperatively associated with a pair of slots 115—115 in the base 64 since bolts 116—116 pass through the feet 114—114 and slots 115—115 to clamp the motor in a desired position relative to the blower. In order to dampen the vibrations set up by operation of the motor, the legs 107—107 are connected to the yoke 106 by sections of rubber 117—117 bonded in adhesion with the yoke and legs. In accordance with this construction, it will be noted that the motor is supported over the aperture 95 in such a way that to remove the motor for repairs all that is necessary is to remove the bolts 116—116 and then to swing the motor and mounting through a quarter turn in order that it may be removed through the aperture 95.

Figure 7:
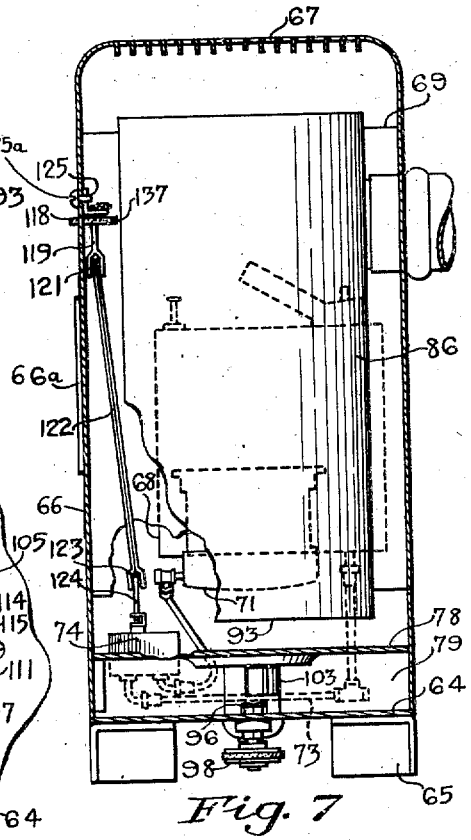
Fig. 7 is an end view of the construction shown in Fig. 5, the casing and parts interiorly thereof being broken away to show the control mechanism.
Figure 10:
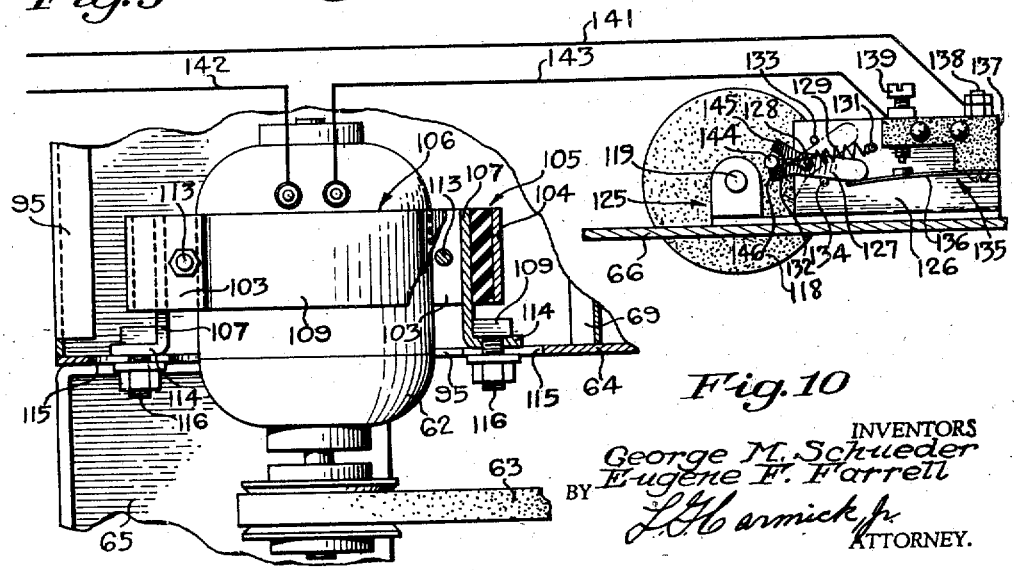
Fig. 10 is a fragmentary view to show the motor mounting depicted in Fig. 9, in side elevation, and also to disclose diagrammatically the connection between the valve control means and the switch controlling operation of the motor, the motor being shown in side elevation and the control wheel in top plan.

Since it is generally desirable to use the blower-forced circulation only with high fuel settings, means are provided to regulate the fuel settings and control the energization of the blower motor by a single manual control. As seen in Fig. 7, the fuel valve unit 74 is controlled by a manual control disk 118 through shafts 119, 120 and 124 and universal joints 121 and 123. This manual control disk 118 is carried by a suitable bracket 125 which has integral therewith a shelf 126 and which is removably secured to the front of the casing 66 by screws 125A, thus permitting this bracket to be detached from the outside of the casing. Shelf 126 carries a bifurcated lever 127 rotatable about fulcrum 128 normally held in either of its extreme positions by means of a tension spring 129 which is anchored to a pin 131 extending from the shelf 126, and a pin 132 on the lever 127. Pins 133 and 134 stationed on either side of the lever 127 and mounted on the shelf 126 effectively limit rotation of the lever about its fulcrum 128. It will be apparent that since the fulcrum 128 is between the points of anchorage of the spring 129, said spring will retain the lever 127 in either of the positions shown. The lever 127 is so mounted as to be cooperatively associated with a switch 135 having a resilient blade 136 mounted on a block 137 of some insulating material such as Bakelite by means of a terminal bolt 138. The blade is normally in contact with a contact screw 139 so that an electric current may flow from a wire 141 to a wire 142 by way of the bolt 138, blade 136, screw 139, a wire 143 and motor 62. Extending perpendicularly from the surface of the control disk 118, a stud 144 is disposed in cooperative relationship with arms 145 and 146 of the lever 127. As rotation of the disk 118 causes engagement of the stud 144 with one of the arms 145 or 146, the lever 127 is rocked about its fulcrum from one extreme position toward the other extreme position, being resisted by the tension of the spring 129 until a midway point is reached, beyond which the spring assists rocking of the lever 127 to a position of rest with a snap. It will therefore be apparent that, as illustrated, counter-clockwise rotation of the disk 118 has just opened the switch 135. Continued counter-clockwise rotation beyond this position is intended to close the valve 74 to extinguish a fire within the stove 72. Clockwise rotation of the disk beyond the position illustrated completes a circuit to the motor 62 as the switch 135 closes, and continued clockwise rotation increases the amount of fuel fed to the burner 71. During clockwise rotation of the disk 118, the stud 144 passes under the bracket 125 and through the casing 66. By means of the snap-action of the switch 135, arcing between the screw 139 and blade 126 is minimized or obviated.

It will be apparent that this interconnection between the blower motor support and the manual fuel setting control by means of a lost motion-snap action type of mechanism causes the blower to be turned on or off when the fuel setting passes a pre-determined point while being turned up or down.

Cabinet shell or casing 66 slidably engages the sides of upright partition 69, is braced thereby, and may be suitably secured thereto if desired. It will be apparent that upon disconnecting the outer flue connection and disconnecting the bracket 125 this cabinet shell 66 may be lifted up from the base 64 to expose all of the operating units which are carried on the base. This permits easy servicing and a simple factory assembly.

While only two embodiments of this invention are illustrated and described in detail herein, it is to be understood that various changes and modifications may be apparent to those skilled in the art without departing from the spirit and scope of this invention, and therefore the same is only to be limited by the scope of the appended claims.

We claim:

1. A unit space heater comprising an upright, floor-supported cabinet containing a combustion heating unit and a contiguous, downwardly-extending passageway for heating air to a high temperature, said cabinet and passageway having an upper air opening and having a lower, lateral air opening communicating directly with the room adjacent but safely above its floor, and fan means in the lower part of said cabinet and passageway discharging substantially horizontally directly from its blades to and out through said lower opening directly into the room so that when said fan means is running it will pull air down through said upper opening and said passageway and discharge this high temperature air out said lower opening substantially horizontally and close to but safely above the room floor to prevent objectionable overheating to the floor close to the heater and, when said fan means is not running, air will rise up by thermal convection through said lower opening and said passageway and out said upper opening.

2. A unit space heater comprising an upright, floor-supported cabinet containing a combustion heating unit and a contiguous, downwardly-extending passageway for heating air to a high temperature, said cabinet and passageway having an upper air opening and having a lower, lateral air opening communicating directly with the room adjacent but safely above its floor, and fan means in the lower part of said cabinet and passageway below said combustion unit and close along side of and discharging directly from its blades substantially horizontally to and directly out through said lower opening so that when said fan means is running it will pull air down through said upper opening and said passageway and discharge this high temperature air out said lower opening substantially horizontally and safely above the room floor to prevent objectionable overheating of the floor close to the heater and, when said fan means is not running, air will rise up by thermal convection through said lower opening and said passageway and out said upper opening.

3. A unit space heater comprising an upright, floor-supported cabinet containing a combustion heating unit and a contiguous, downwardly-extending passageway for heating air to a high temperature, said passageway having an upper air opening and having a lower, lateral air opening communicating directly with the room adjacent but safely above its floor, and fan means in the lower part of said cabinet and passageway, an electric motor driving said fan means and positioned safely out of the path of high temperature air, said fan means discharging directly from its blades substantially horizontally to and out through said lower opening so that when said fan means is running it will pull air down through said passageway and discharge and horizontally direct this high temperature air out said lower opening and, when said fan means is not running, air will rise up by thermal convection through said lower opening and said passageway and out said upper opening.

4. A unit space heater comprising an upright, floor-supported cabinet containing a combustion heating unit and a contiguous, downwardly-extending passageway for heating air to a high temperature, said passageway having an upper air opening and having a lower, lateral air opening communicating directly with the room adjacent its floor, and an upright axis, centrifugal blower wheel in the lower part of said cabinet and passageway alongside of and discharging directly and horizontally to and out through said lower opening so that when said blower is running it will pull air down through said passageway and will direct and discharge this heated air horizontally from its blades out said lower opening and, when said blower is not running, air will rise up by thermal convection through said lower opening and said passageway and out said upper opening.

5. A unit space heater comprising an upright, floor-supported cabinet containing a combustion heating unit and a contiguous, downwardly-extending passageway for heating air to a high temperature, said cabinet and passageway having an upper air opening and having a lower, lateral air opening communicating directly with the room adjacent its floor, and an upright axis, centrifugal blower wheel in the lower part of said cabinet and passageway alongside of and discharging horizontally directly to and directly out through said lower opening so that when said blower is running it will pull air down through said upper opening and said passageway and will direct and discharge this heated air horizontally from its blades out said lower opening and, when said blower is not running, air will rise up by thermal convection through said lower opening and said passageway and out said upper opening, said cabinet having a blower-driving electric motor positioned safely out of the path of high temperature air, and means to cool said motor including an opening in said cabinet adjacent said motor to draw relatively cool air past said motor to the suction side of said blower.

6. A unit space heater including an upright, floor-supported cabinet containing a combustion-heating unit and an associated, contiguous passageway for heating air to a high temperature, said cabinet and passageway having an air inlet and having a narrow, substantially horizontally-directed opening across the front portion of the cabinet adjacent to but spaced slightly above the floor, and fan means having its blades arranged to discharge air horizontally and located in said cabinet and passageway adjacent to and substantially at the level of said opening to pull air through said air inlet and passageway and forcibly eject this high temperature air out through said opening directly into the room in a wide, thin, substantially horizontal stream spaced above the room floor sufficiently and at a velocity high enough to prevent dangerous local overheating thereof.

7. A unit space heater comprising an upright cabinet with a closed bottom spaced above the floor of the room to be heated by supporting legs, a combustion-heating unit and a contiguous, downwardly-extending passageway for heating air to a high temperature in said cabinet, said passageway and the top of said cabinet having an upper air opening, said cabinet having a long, narrow grille forming substantially horizontally-directed and relatively restricted openings across its front portion adjacent the room floor and immediately above the closed bottom, a substantially horizontal partition spaced above said closed bottom adjacent the top of said grille to form a plenum chamber, an upright-axis, centrifugal blower wheel in said plenum chamber under said combustion-heating unit and supported on said closed bottom by vibration-absorbing means, opening means through said partition communicating the lower end of said passageway with the central portion of said centrifugal blower so that, during operation of said centrifugal blower, it will draw air down through said upper opening, said passageway, and said partition-opening means and discharge it horizontally from its blades to and through said plenum chamber and through the length of said long, narrow grille in a substantially horizontally directed, wide, thin stream, or, when the blower is not operating, air will enter said grille and, following the above path in reverse order, rise by normal thermal convection out of said upper opening.

8. A unit space heater including an upright, sheet metal casing having an upper air opening, a closed bottom and feet to space it slightly above the room floor, and a grille forming lateral, substantially horizontally-directed air openings adjacent its bottom, and said casing containing a high temperature combustion-heating unit with a contiguous, upwardly-extending, air heating passageway, the upper portion of which opens through said upper air opening, and an upright-axis, centrifugal blower having its intake communicating with the lower portion of said passageway and positioned under said combustion unit at the level of said lateral openings to horizontally discharge high temperature air directly from its blades to and out said openings in a substantially horizontal, forced stream spaced slightly above the room floor to avoid dangerous overheating thereof.

9. A unit space heater including an upright, sheet metal casing having an upper air opening, a closed bottom and feet to space it slightly above the room floor, and a grille forming lateral, substantially horizontally-directed air openings adjacent its bottom, said casing containing a high temperature combustion-heating unit with a contiguous, upwardly-extending, air heating passageway, the upper portion of which opens through said upper air opening, and an upright-axis, centrifugal blower having its intake communicating with the lower portion of said passageway and positioned under said combustion unit at the level of said lateral openings to discharge high temperature air therethrough in a substantially horizontal, forced stream spaced slightly above the room floor to avoid dangerous overheating thereof, and an electric motor connected to drive said blower and removably carried by said bottom out of the path of heated air, and means including an opening through said bottom to draw cooling air past said electric motor.

10. A unit space heater including an upright, sheet metal casing having an upper air opening, a closed bottom and feet to space it slightly above the room floor, and a grille forming lateral, substantially horizontally-directed air openings adjacent its bottom, said casing containing a high temperature combustion-heating unit with a contiguous, upwardly-extending, air heating passageway, the upper portion of which opens through said upper air opening, and an upright-axis, centrifugal blower having its intake communicating with the lower portion of said passageway and positioned under said combustion unit at the level of said lateral openings to discharge high temperature air therethrough in a substantially horizontal, forced stream spaced slightly above the room floor to avoid dangerous overheating thereof, and an upright electric motor carrying the centrifugal blower on the upper end of its shaft to form a removable unit therewith, said electric motor being spaced below said bottom to keep it cool and being carried on a removable plate closing an opening in said bottom large enough to pass said blower.

11. In a forced air circulating type, unit space heater, a rectangular type, open top cabinet having upright sheet metal side walls and a closed sheet metal bottom adapted to be spaced above the room floor, upright partition means extending from front to back side walls and from said bottom to adjacent the top of said cabinet adjacent and end thereof to form an open top air passage, said bottom having an opening under said passage, a fuel tank supported on said upright partition in said passage, horizontal partition means spaced above said bottom to form therewith and with said side walls and upright partition a flat plenum chamber, an upright air heating unit supported on said horizontal partition, a flat, upright-axis, centrifugal blower in and discharging into said plenum chamber and positioned under said heating unit, said horizontal partition having an opening communicating said air heating unit to said blower intake, and substantially horizontally-directed air discharge openings through the front side wall from said plenum chamber.

12. In a forced air circulating type, unit space heater, a rectangular type, open top cabinet having upright sheet metal side walls and a closed sheet metal bottom adapted to be spaced above the room floor, upright partition means extending from front to back side walls and from said bottom to adjacent the top of said cabinet adjacent an end thereof to form an open top air passage, said bottom having an opening under said passage, a fuel tank supported on said upright partition in said passage, an electric motor in the lower part of said passage and connected to drive said blower, horizontal partition means spaced above said bottom to form therewith and with said side walls and upright partition a flat plenum chamber, an upright air heating unit supported on said horizontal partition, a flat, upright-axis, centrifugal blower in and discharging into said plenum chamber and positioned under said heating unit, said horizontal partition having an opening communicating said air heating unit to said blower intake, and substantially horizontally-directed air discharge openings through the front side wall from said plenum chamber.

13. In a forced air circulating type, unit space heater having an upright cabinet with a closed bottom spaced slightly above the room floor, means forming an opening from the room into the space below said bottom, a heater in said cabinet, an upright-axis, centrifugal blower in said cabinet adjacent its bottom, a removable closure member carrying said blower and closing an opening in said bottom large enough to permit withdrawal of said blower therethrough, said opening serving as an air intake upon removal of said closure member and blower.

14. In a unit space heater or the like, an upright cabinet having a substantially horizontal partition, a flat plenum chamber therein adjacent its bottom, a heating unit in said cabinet above said partition, a long, narrow, lateral grille forming relatively restricted, substantially horizontally-directed openings from said plenum chamber through the cabinet side adjacent its bottom directly into the room to be heated, a flat, substantially horizontally-discharging, centrifugal blower located in and discharging hot air from above said partition into said plenum chamber to build up pressure therein so that hot air is discharged substantially horizontally and directly into the room throughout the length of said grille.

15. A unit space heater comprising an upright, cylindrical, sheet metal cabinet having a lower sheet metal bottom secured to and bracing said cabinet walls, and feet extending below said plate to support said cabinet on the floor of the room to be heated, a sheet metal partition secured to and bracing said cabinet walls closely above said bottom plate to form a flat chamber therebetween, an upright combustion-heating unit removably supported in said cabinet above said partition plate, said cabinet enclosing a downwardly-extending air heating passageway contiguous to said combustion-heating unit and open at its upper and lower ends, a substantially flat, sheet metal top on said cabinet having a grille therein to form an upper opening communicating with the open upper end of said passageway, an integral, stamped grille of upright members across the lower front portion of said cabinet walls forming a long, narrow opening from said flat chamber, an upright-axis, wide, thin, backward-tipped bladed, centrifugal blower wheel positioned eccentrically to the rear in said flat chamber, an upright-axis electric motor positioned below said lower plate and carrying said blower wheel on the upper end of its shaft, and means yieldingly and removably mounting said blower and motor on said bottom.

16. A unit space heater comprising an upright, floor-supported cabinet containing a combustion air heating unit, means to regulate the fuel supply thereto including a manual control on said cabinet, means including an upper opening and a lower lateral opening in said cabinet to permit upward thermal convection circulation of air through said cabinet in heat exchange relation with said combustion unit, fan means in said cabinet to circulate air downwardly therethrough in reversed thermal convection flow and out said lower opening, an electric motor driving said fan means, a motor control switch interconnected with said manual control to energize said fan motor only for high fuel settings to give downward air flow and to de-energize for lower fuel settings to permit said upward air flow.

17. A unit space heater comprising an upright, floor-supported cabinet containing a combustion air heating unit, means to regulate the fuel supply thereto including a manual control on said cabinet, means including an upper opening and a lower lateral opening in said cabinet to permit upward thermal convection circulation of air through said cabinet in heat exchange relation with said combustion unit, fan means in said cabinet to circulate air downwardly therethrough in reversed thermal convection flow and substantially horizontally out said lower opening, means communicating with the discharge side of said fan means to supply said combustion unit with air under forced draft during fan operation, an electric motor driving said fan means, a motor control switch interconnected with said manual control to energize said fan motor for high fuel settings to give said downward air flow and forced draft to said combustion unit, and to de-energize it for lower fuel settings to permit said upward air flow.

18. An air circulating, unit space heater or the like including an upright cabinet, a combustion air heating unit therein, and flue and combustion air supply conduits for said combustion unit, said conduits supporting said combustion unit and connecting it to said cabinet, an air heating passageway contiguous to said heating unit and a fan in said cabinet to force air circulation through said heating passageway, said fan being close to at least one of said combustion air supply conduits, and said combustion air supply conduit having a cooperating opening facing said fan to supply forced draft from the fan to said combustion heating unit.

19. In a unit space heater, a floor-supported cabinet enclosing an air heating unit and having a lower lateral air discharge opening adjacent to the room floor, and means including a fan having a substantially horizontal discharge directly from its blades at substantially the level of said opening to force circulation of air in heating relation with said heating unit and out said opening directly into the room horizontally directed by the fan blades.

20. In a forced air circulating type, unit space heater having an air heating unit, a floor-supported cabinet enclosing said air heating unit and having a bottom spaced above the room floor, means forming an opening from the room into the space beneath said bottom, an air circulating fan in said cabinet, an opening in said bottom large enough to permit removal of said fan therethrough, and means mounting said fan on said bottom over said opening and permitting removal of said fan therethrough, said opening serving as a relatively large, unobstructed, air intake for gravity air circulation when said fan is removed.

21. In a forced air circulating, unit, room heater having a floor supported cabinet enclosing a high temperature combustion air heating unit and having a bottom close to but spaced safely above the room floor, means including a fan in said cabinet circulating air down past said heating unit and discharging this high temperature air directly into the room adjacent the floor, an electric motor connected to drive said fan, an opening in said bottom large enough to permit withdrawal of said fan therethrough, and means mounting said fan on said bottom over said opening and carrying said electric motor and preventing overheating thereof by shielding it from said high temperature air.

22. A unit heater for a room or the like comprising a floor supported upright casing, a high temperature combustion heating unit in said casing, a stack for said combustion heating unit, means forming a downwardly extending high temperature air heating passageway contiguous to and associated with said heating unit, air inlet means for the upper end of said passageway, a horizontally directed discharge opening from the lower part of said passageway directly into the room and positioned closely adjacent to but safely above the room floor, a horizontally directed fan below said heating unit and at the level of said discharge opening to provide a forced stream of high temperature air directly from the fan's blades out through said discharge opening and across the floor without objectionable overheating of said floor close to the heater.

23. An air circulating space heater comprising a floor-supported housing having an open upper end, a closed bottom, and a lower lateral opening, a combustion air-heating unit in said housing, a fan in said housing drawing air in said open upper end, down past said heating unit, and discharging it out said lower lateral opening, and a removable closure member carrying said fan and closing an opening in said bottom large enough to permit removal of said fan therethrough, means to admit air to said bottom opening, said opening in said bottom serving as an additional air intake opening for gravity air circulation in the absence of said fan and closure member.

24. An air circulating heater comprising a combustion air-heating unit having a stack and operable by natural draft, means forming an air circulating passageway in heat exchange relation therewith and operable by gravity air circulation, fuel supply regulating means, means to supply forced draft combustion air to said combustion unit and to provide a forced air circulation through said passageway, control means therefor, and a common control so connected to said fuel regulating means and to said control means that for low fuel settings combustion is by gravity draft only and heated air circulation is by gravity circulation only, while for higher fuel settings combustion is by forced draft and the heated air circulation is forced.

25. A heater comprising a combustion heating unit, a stack therefor, means to supply combustion air thereto by gravity circulation, means to supply combustion air thereto under forced draft, and control means therefor, infinitely variable fuel supply regulating means, and a common control means connected to said fuel supply regulating means and to said forced draft control means so that for low fuel settings combustion is by gravity air circulation only and for higher fuel settings combustion is by forced draft.

26. An air circulating unit space heater comprising an upright, floor-supported cabinet, a combustion air-heating unit therein, a fuel regulating valve therefor alongside said combustion unit, an upwardly-extending, rotary, control shaft to adjust said valve, means forming an air circulating passageway in heat exchange relation with said heating unit, fan means to force air through said passageway, a motor driving said fan means, and means, including a member carried by said shaft, controlling the energization of said motor at an intermediate fuel setting.

27. A circulating air heater comprising a combustion air-heating unit, means forming an air circulating passageway in heat exchange relation therewith and operable by gravity air circulation, fuel supply regulating means, means to provide a forced air circulation through said passageway, control means therefor, and a common control so connected to said fuel supply regulating means and to said forced air circulation control that as the fuel supply, and hence the heat output, is increased to an intermediate setting the forced air circulation is started.

28. A unit space heater comprising an upright cabinet containing a combustion-heating unit and having means forming a contiguous, downwardly-extending, air heating passageway, said combustion unit having an upper flue means and an air supply means including a lower opening to atmosphere to supply combustion air for a moderate fire by thermal convection, said cabinet having means forming an upper air opening for said passageway and having means forming an air opening for the lower portion of said passageway, said lower opening discharging directly into the space to be heated, a driving motor and a connected fan both enclosed in the lower portion of said cabinet to circulate air in said upper opening, down said passageway, and out said lower opening, said combustion air supply means including an opening to the discharge side of said fan means to supply a forced draft for a high fire during operation of said fan means, said parts being arranged so that, upon non-operation of said fan means, air may enter said lower opening and rise through said passageway and out said upper opening by normal thermal convection.

29. A circulating air heater comprising an upright cabinet, a combustion heating unit therein, means forming an upwardly-extending air circulating passageway in heat exchange relation therewith and operable by gravity air circulation, said cabinet having an upper and a lower opening for said passageway, means to supply combustion air to said heating unit by gravity circulation, fan means adjacent said lower opening to cause a flow of air down through said passageway and directly out into the space to be heated, and means forming a passageway from the discharge side of said fan means to said combustion heating unit to supply forced draft combustion air thereto only during operation of said fan means.

30. In a forced air circulating type unit space heater having an upright cabinet, an upright air heating combustion drum unit therein, a closed bottom for said cabinet adapted to be spaced above the room floor, a wide partition means spaced close above and substantially parallel to said bottom forming therebetween a wide flat plenum chamber and supporting said air heating combustion drum unit thereon, said cabinet having restricted openings directly from said plenum chamber into the space to be heated, and means to force air from said air heating unit into said plenum chamber under a slight pressure for discharge through all of said restricted openings.

31. In a unit space heater or the like, an upright cabinet having means forming a flat plenum chamber therein adjacent and across its bottom, a combustion heater in said cabinet above said plenum chamber, a long, relatively narrow grille of upright members in the cabinet side wall adjacent its bottom forming relatively restricted openings from said plenum chamber directly into the room, fan means in said cabinet discharging hot air from adjacent said heater directly into said plenum chamber to build up a slight pressure only in said plenum chamber so that said hot air is discharged therefrom throughout the length of said grille and from all of its openings.

32. A unit space heater comprising a floor supported cabinet having a lateral opening adjacent the room floor, a fuel burner and an associated expansion chamber in said cabinet, and means including a vertical axis centrifugal blower below said expansion chamber at the level of said opening and having a substantially horizontal discharge directly from its blades to pull air in heating relation with said expansion chamber and discharge it horizontally to and out through said opening into the room to be heated.

33. In a direct fired type, unit space heater, an upright cabinet having a closed bottom adjacent the room floor and having a lateral opening adjacent said bottom, a combustion heating unit in said cabinet, and an upright-axis centrifugal blower wheel in said cabinet adjacent said bottom and discharging substantially horizontally and directly to and out said opening directly into the room to produce a stream directed horizontally by the blades of said blower wheel.

34. An air circulating unit space heater comprising a floor-supported cabinet having an open top and a bottom opening, said cabinet containing a fuel burner and an upright expansion chamber therefor, and means forming an associated, upright and open ended air-heating passageway whereby natural gravity circulation of air being heated will be into said bottom opening, up said passageway, and out said open top, and means to pull air downwardly in said passageway and force it directly into the room to be heated in a low level, substantially horizontal stream, including a lateral discharge opening adjacent the room floor and a blower unit positioned in said bottom opening below said expansion chamber and being removable from beneath said cabinet, said blower unit comprising a driving electric motor and an adjacent, coaxially coupled, upright axis centrifugal blower at the level of said discharge opening and having a substantially horizontal discharge directly from its blades through said discharge opening and into the room to be heated.

35. An air circulating unit space heater comprising a floor-supported cabinet having an open top and a bottom opening and an upright front wall with a lateral opening therein adjacent to and spaced safely slightly above the room floor, said cabinet containing a fuel burner, an expansion chamber therefor above said lateral opening, and associated means forming an upright, open ended, air-heating passageway so that there will be a natural gravity circulation of air being heated in through said bottom opening, up said passageway, and out said open top, a blower unit removably positioned in said bottom opening below said expansion chamber and being removable from beneath said cabinet to pull air downwardly in said passageway and to force it directly from said lateral opening into the room to be heated in a low level, substantially horizontal stream, said blower unit comprising an upright-axis centrifugal blower at the level of said discharge opening and having a substantially horizontal discharge directly from its blades through said discharge opening into the room to be heated, and a coupled, coaxial, blower-driving electric motor under said blower and positioned out of the path of the hot air to prevent overheating thereof.

36. In combination, a liquid fuel burner, a float chamber, means for delivering liquid fuel thereto, a liquid fuel line extending from said float chamber to said burner, means for supplying air to said burner, including a motor, and a motor circuit therefor, a valve in said float chamber, adapted to control the flow of liquid fuel from the float chamber to the burner, means for adjusting the setting of said valve, including an exterior manually operable rotatable knob, and means for controlling said motor circuit in predetermined relationship to the movement of said valve, including a switch in said circuit, and means for actuating said switch in response to rotation of said knob the switch actuating means being adapted to close the switch in response to rotation of the knob only after substantial opening of the valve has taken place.

37. In combination, in control means for a liquid fuel burner, a float chamber, a valve in said chamber, and a valve seat to which it is opposed, means for opening and closing said valve, including a rotatable stem, a rotatable manual control knob for said stem located exteriorly of said float chamber, a switch, and means for controlling said switch in response to rotation of said knob said means being adapted to close the switch only after knob movement sufficient to effect appreciable valve opening has taken place.

38. In combination, in control means for a liquid fuel burner, a float chamber, a valve in said chamber, and a valve seat to which it is opposed, means for opening and closing said valve, including a rotatable stem, a rotatable manual control knob for said stem located exteriorly of said float chamber, a switch adjacent said control knob, and means for controlling said switch in response to rotation of said knob said means being adapted to close the switch only after knob movement sufficient to effect appreciable valve opening has taken place.

39. A fuel and air control device for a liquid fuel burner comprising a float chamber, a rotary fuel metering valve for modulating the rate of fuel feed from said chamber, means for rotating said valve to adjust the same including a rotatable stem, a rotatable manual control member for said stem located exteriorly of said float chamber, a quick acting switch mounted adjacent said rotatable stem, and means for actuating said switch in response to rotation of said manual control member, said means being arranged to close said switch only after knob movement sufficient to effect appreciable valve opening has occurred.

40. A fuel and air control device for a liquid fuel burner comprising a float chamber, an infinitely variable rotary fuel metering valve controlling the fuel outlet from said chamber, means for opening and closing said valve including a rotatable control shaft, a rotatable manual control member secured to said shaft, a snap action switch mounted adjacent said shaft, and means for actuating said switch in response to rotation of said rotatable manual control member, said means being arranged to close said switch after rotation of said manual control member in one direction sufficient to effect appreciable valve opening and to open said switch after rotation of said manual control member in the opposite direction sufficient to effect partial closing of said valve.

41. A heater comprising a combustion heating unit, means to supply combustion air thereto by gravity circulation, a rotary fuel metering valve for manually modulating the fuel supply to said unit, electrically operated blower means to supply combustion air to said unit under forced draft, a snap action switch for controlling said blower means, a manual rotary control member so connected to said fuel metering valve and to said snap action switch that as the fuel supply is increased to a prescribed intermediate setting said snap action switch is closed to effect operation of said blower means.

42. A circulating air heater comprising a combustion air heating unit, means forming an air circulating passageway permitting gravity circulation of air in heat exchange relationship with said heating unit, a rotary fuel metering valve for manually modulating the rate of combustion in said heating unit, electrically operated blower means to supply forced air circulation through said passageway, a snap action switch for controlling said blower means, a manual rotary control member so connected to said fuel metering valve and to said snap action switch that as the fuel supply is increased to effect a prescribed rate of combustion said snap action switch is closed to effect operation of said blower means.

GEORGE M. SCHUEDER.
EUGENE F. FARRELL.